(12) United States Patent
Towler et al.

(10) Patent No.: US 6,548,029 B1
(45) Date of Patent: Apr. 15, 2003

(54) APPARATUS FOR PROVIDING A PURE HYDROGEN STREAM FOR USE WITH FUEL CELLS

(75) Inventors: Gavin P. Towler, Barrington, IL (US); Kurt M. Vanden Bussche, Lake in the Hills, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/442,612

(22) Filed: Nov. 18, 1999

(51) Int. Cl.[7] .................................................. B01J 8/02
(52) U.S. Cl. ...................... 422/230; 422/189; 422/190; 422/191; 422/192; 422/193; 422/198; 422/211
(58) Field of Search .................................. 422/173, 187, 422/188, 189, 190, 191, 192, 193, 198, 202, 203, 205, 211, 216, 230; 48/128

(56) References Cited

U.S. PATENT DOCUMENTS

| | | | | |
|---|---|---|---|---|
| 2,248,734 A | * | 7/1941 | Barr | 422/191 |
| 3,090,667 A | * | 5/1963 | Connellan | 208/146 |
| 3,825,501 A | * | 7/1974 | Muenger | 252/373 |
| 3,904,386 A | * | 9/1975 | Graboski et al. | 423/656 |
| 3,910,347 A | * | 10/1975 | Woebcke | 165/142 |
| 4,024,903 A | * | 5/1977 | Yamada et al. | 122/7 R |
| 4,479,925 A | | 10/1984 | Shires et al. | 423/359 |
| 4,522,894 A | | 6/1985 | Hwang et al. | 429/17 |
| 4,554,223 A | * | 11/1985 | Yokoyama et al. | 429/20 |
| 4,700,771 A | * | 10/1987 | Bennett et al. | 165/133 |
| 4,746,329 A | | 5/1988 | Christner et al. | 48/61 |
| 4,925,456 A | | 5/1990 | Egglestone | 48/127.9 |
| 5,110,559 A | | 5/1992 | Kondo et al. | 422/109 |
| 5,286,884 A | * | 2/1994 | Cowley et al. | 422/198 |
| 5,458,857 A | | 10/1995 | Collins et al. | 422/198 |
| 5,464,606 A | | 11/1995 | Buswell et al. | 423/655 |
| 5,559,275 A | * | 9/1996 | Barger | 568/403 |

FOREIGN PATENT DOCUMENTS

| | | |
|---|---|---|
| EP | 0 199 878 | 11/1986 |
| WO | WO 97/44123 | 11/1997 |

OTHER PUBLICATIONS

Article "New Hydrocarbon Proton Exchange Membranes Based on Sulfonated Styrene–Ethylene/Butylene–Styrene Triblock Copolymers" by G.E. Wneck et al., Electrochemical Society Proceedings (1995), vol. 95–23, pp. 247–251.

Article "Will Developing Countries Spur Fuel Cell Surge?" by Singh, Chemical Engineering Progress, Mar. 1999, pp. 59–66.

* cited by examiner

Primary Examiner—Jerry D. Johnson
Assistant Examiner—Basia Ridley
(74) Attorney, Agent, or Firm—John G. Tolomei; Frank S. Molinaro; Maryann Maas

(57) ABSTRACT

An apparatus is provided which comprises a thermosiphon shift reactor for the conversion of carbon monoxide and the generation of steam for use in a fuel processor for the conversion of hydrocarbon fuels into hydrogen and employs the hydrogen in a fuel cell. The thermosiphon shift reactor comprises a vertically extended shell defining an interior volume containing a vertical axis defining a catalyst zone. The vertically extended shell contains a catalyst zone comprising a shift catalyst wherein a high temperature shift catalyst is disposed in successively tapering layers relative to a low temperature shift catalyst and the catalyst zone is at least partially surrounded by an external jacket which defines a flow passage between the vertically extended shell and the external jacket. A fluid reservoir is located above the vertically extended shell at a height effective to establish a thermosiphon effect between the flow passage and the reservoir which generates steam and provides an essentially uniform temperature at the shell wall.

10 Claims, 2 Drawing Sheets

APPARATUS FOR PROVIDING A PURE HYDROGEN STREAM FOR USE WITH FUEL CELLS

FIELD OF THE INVENTION

The present invention relates to a reaction vessel having a descending temperature profile and a thermosiphon and its use in water gas shift processes associated with the production of electricity from fuel cells.

BACKGROUND OF THE INVENTION

Fuel cells are chemical power sources in which electrical power is generated in a chemical reaction. The most common fuel cell is based on the chemical reaction between a reducing agent such as hydrogen and an oxidizing agent such as oxygen. The consumption of these agents is proportional to the power load. Polymers with high protonic conductivities are useful as proton exchange membranes (PEM's) in fuel cells. Among the earliest PEM's were sulfonated, crosslinked polystyrenes. More recently, sulfonated fluorocarbon polymers have been considered. Such PEM's are described in an article entitled, "New Hydrocarbon Proton Exchange Membranes Based on Sulfonated Styrene-Ethylene/Butylene-Styrene Triblock Copolymers", by G. E. Wnek, J. N. Rider, J. M. Serpico, A. Einset, S. G. Ehrenberg, and L. Raboin presented in the Electrochemical Society Proceedings (1995), Volume 95-23, pages 247 to 251.

Hydrogen is widely produced for chemical and industrial purposes by converting materials such as hydrocarbons and methanol in a reforming process to produce a synthesis gas. Such production usually takes place in large facilities which are rarely turned down in production for even a few days per year. In addition, the operation of the industrial hydrogen production facilities is often integrated with associated facilities to improve the use of energy for the overall complex. Synthesis gas is the name generally given to a gaseous mixture principally comprising carbon monoxide and hydrogen, but also possibly containing carbon dioxide and minor amounts of methane and nitrogen. It is used, or is potentially useful, as feedstock in a variety of large-scale chemical processes, for example: the production of methanol, the production of gasoline boiling range hydrocarbons by the Fischer-Tropsch process, and the production of ammonia.

Processes for the production of synthesis gas are well known and generally comprise steam reforming, autothermal reforming, non-catalytic partial oxidation of light hydrocarbons or non-catalytic partial oxidation of any hydrocarbons. Of these methods, steam reforming is generally used to produce synthesis gas for conversion into ammonia or methanol. In such a process, molecules of hydrocarbons are broken down to produce a hydrogen-rich gas stream. A paper titled "Will Developing Countries Spur Fuel Cell Surge?" by Rajinder Singh, which appeared in the March 1999 issue of *Chemical Engineering Progress*, page 59–66, presents a discussion of the developments of the fuel cell and methods for producing hydrogen for use with fuel cells. The article particularly points out that the partial oxidation process is a fast process permitting small reactors, fast startup, and rapid response to changes in the load, while steam reforming is a slow process requiring a large reactor and long response times, but operates at a high thermal efficiency. The article highlights one hybrid process which combines partial oxidation and steam reforming in a single reaction zone as disclosed in U.S. Pat. No. 4,522,894.

Modifications of the simple steam reforming processes have been proposed to improve the operation of the steam reforming process. In particular, there have been suggestions for improving the energy efficiency of such processes in which the heat available from the products of a secondary reforming step is utilized for other purposes within the synthesis gas production process. For example, processes are described in U.S. Pat. No. 4,479,925 in which heat from the products of a secondary reformer is used to provide heat to a primary reformer.

The reforming reaction is expressed by the following formula:

$$CH_4 + 2H_2O \rightarrow 4H_2 + CO_2$$

where the reaction in the reformer and the reaction in the shift converter are respectively expressed by the following simplified formulae (1) and (2):

$$CH_4 + H_2O \rightarrow CO + 3H_2 \qquad (1)$$

$$CO + H_2O \rightarrow H_2 + CO_2 \qquad (2)$$

In the water gas shift converter which typically follows a reforming step, formula (2) is representative of the major reaction. In the water gas shift converter, at least a portion of the carbon monoxide, which has a deleterious effect on the operation of certain types of fuel cells, particularly PEM fuel cells, is combined with water to shift the equilibrium to produce hydrogen and carbon dioxide. The reaction is generally conducted over a catalyst. Typical water gas shift catalysts include iron-based catalysts such as zinc ferrite ($ZnFe_2O_4$), ferric oxide ($Fe_2O_3$), magnetite ($Fe_3O_4$), chromium oxides, and mixtures such as iron/chromia (90–95% $Fe_2O_3$ and 5–10% $Cr_2O_3$). Other shift catalysts employed at lower temperatures include copper promoted zinc oxide, copper promoted chromia, and mixtures thereof. The water gas shift reaction is a highly exothermic equilibrium reaction and requires active control of the reactor temperature to produce the desired products.

Others have attempted to integrate the water gas shift reaction into an integrated fuel processor to produce hydrogen for fuel cells. Typically, these efforts have resulted in an apparatus which attempts to integrate the endothermic reforming reaction zone with the exothermic water gas shift reaction zone in a device which disposes these zones adjacent one another. Often these gases are disposed in concentric annular segments of compact devices.

U.S. Pat. No. 4,746,329 discloses a methanol fuel reformer for use in conjunction with fuel cell power plants comprising a plurality of annular chambers which are interconnected in a manner to promote fuel vaporization, reforming, and shift conversion.

U.S. Pat. No. 4,925,456 discloses an apparatus comprising a plurality of double pipe heat exchangers used for primary reforming in a combined primary and secondary reforming process and apparatus which also may contain a carbon monoxide shift catalyst.

U.S. Pat. No. 5,110,559 discloses a shift converter which is surrounded by a shift converter jacket to which reforming off-gas is sent during startup to heat the shift converter and which is switched to cooling during operation of the shift converter.

U.S. Pat. No. 5,458,857 discloses a combined reformer and shift reactor which comprises a cylindrical reforming chamber arranged within and on the axis of a cylindrical vessel. A steam generator is arranged around the reforming chamber and a plurality of shift reactors extend axially, with respect to the vessel, through the steam generator.

U.S. Pat. No. 5,464,606 discloses a method and apparatus for carrying out the shift reactor which employs a two-section reactor. The second section is cooled by indirect heat exchange with cooled effluent from the second section.

WO 97/44123 discloses a shift converter for use with an electrochemical fuel cell for the production of electricity. The shift converter uses an upstream adiabatic zone and a downstream actively cooled zone. The actively cooled zone is cooled by a pressurized water coolant circulated in cooling coils disposed in the actively cooled catalyst zone which boils as it cools the process gas stream.

EPO 0199878A2 discloses an apparatus for use in a pressurized phosphoric acid fuel cell system which incorporates a shift reactor into the reforming reactor to improve heat transfer from the reformer gas into the reforming reaction chamber.

A water gas shift reaction vessel is required to carry out the exothermic water gas shift reaction while cooling the resulting effluent gases from approximately 750° to about 100° C. This large temperature gradient implies that thermal stresses within the water gas shift reaction vessel will be large. A large temperature gradient can result in severe operating problems, particularly when portions of the reaction vessel have boiling liquid on one side and water vapor on the other side. When this occurs, because the water vapor has a much lower heat transfer coefficient than the boiling liquid, it is not possible to remove a sufficient amount of heat from the water gas shift reacting side. In addition, when the water gas shift reaction vessel is used in conjunction with a fuel cell for the generation of electricity, the operation or generation of electricity may require a variation in the steam supply rate to the reforming reactions. This variation in the demand for steam occurs because the steam flow rate generally is proportional to the amount of hydrocarbon fed to the process. The hydrocarbon feed rate to the reforming process typically is controlled to match the fuel cell demand for hydrogen, which in turn varies with the demand for electricity. For this reason, variations in the level of boiling liquid, which result from a change in the steam demand and are proportional to the steam flow rate, must be avoided.

It is an objective of the present invention to provide a water gas shift reactor to generate steam in a continuous manner to an upstream reforming process.

It is an objective of the present invention to provide an apparatus that minimizes thermal cycling and the resulting damage from thermal stresses to heat exchanger zones and maintains an essentially uniform thermal profile in the water gas shift reactor.

SUMMARY OF THE INVENTION

The present invention combines the shift reactor for fuel cell applications with a small-scale thermosiphon steam boiler in a single reaction zone. The reaction zone contains a catalyst zone that comprises high temperature and low temperature shift catalyst. The catalyst zone is in intimate thermal contact with a heat exchange surface that indirectly exchanges heat with water circulating by thermosiphon in a direction which is countercurrent to the passage of reformed gas through the catalyst zone. A fluid reservoir disposed above the catalyst zone facilitates the thermosiphon circulation and stabilizes the generation of steam while surprisingly providing an essentially uniform temperature at the heat exchange surface. The essentially uniform heat exchange surface effectively eliminates thermal cycling during the operation of the thermosiphon shift reactor.

In one embodiment, the thermosiphon shift reactor of the present invention comprises a vertically extended shell defining an interior volume containing a vertical axis. The vertically extended shell has a gas inlet and a gas outlet. The interior volume extends along a vertical length defining a catalyst zone. The catalyst zone comprises a shift catalyst. A jacket sealingly surrounds at least a portion of the length of the vertically extended shell and defines a flow passage between the vertically extended shell and the jacket. A fluid reservoir is located above the catalyst zone in fluid communication with the flow passage at a height effective to provide a thermosiphon circulation of water/steam between the flow passage and the reservoir.

DETAILED DESCRIPTION OF THE INVENTION

Figure 1:
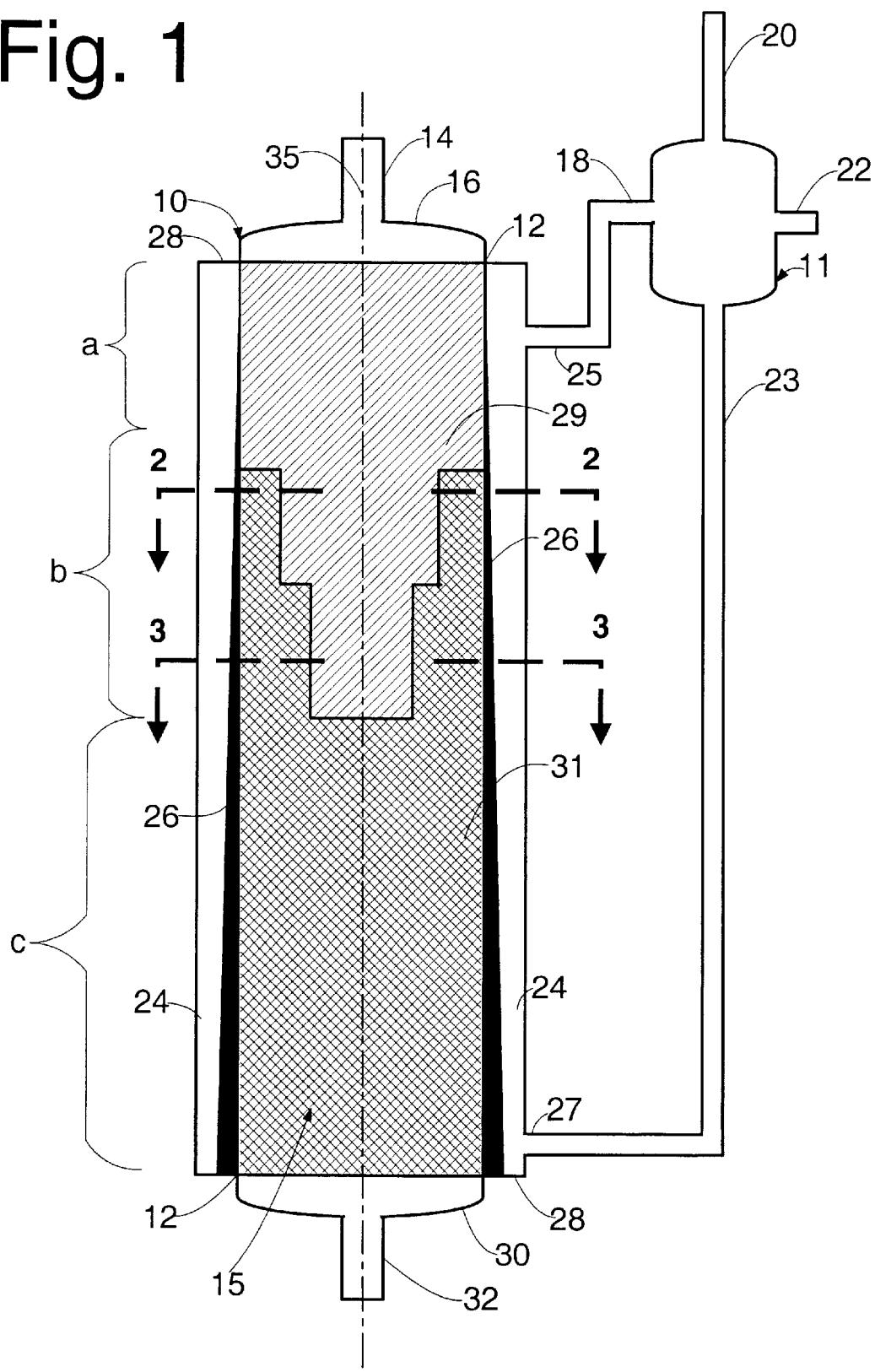
FIG. 1 is a sectional elevation of the thermosiphon shift reactor apparatus.

A water gas shift reaction zone contains at least one water gas shift catalyst zone and provides for the conversion of carbon monoxide to hydrogen to produce a hydrogen product stream which has a reduced amount of carbon monoxide. The water gas shift reaction is a highly exothermic reversible reaction and must be actively cooled to maintain the driving force toward the conversion of carbon monoxide and water to carbon dioxide and hydrogen. The water gas shift reaction zone of the present invention is cooled by indirect heat exchange to generate steam. All or a portion of the steam stream produced in this manner is returned to be admixed with the hydrocarbon feedstock to a reforming zone. The reforming effluent is passed to at least one water gas shift reaction zone which exothermically reacts the carbon monoxide over a shift catalyst in the presence of an excess amount of water to produce additional amounts of carbon dioxide and hydrogen.

The following is a description of a two-zone water gas shift reaction zone, although any number of water gas shift reaction zones may be employed to reduce the carbon monoxide level in the $H_2$ product. The steam reforming effluent is passed to a high temperature shift zone at an effective high temperature shift reaction temperature ranging from about 550° C. to about 750° C. The high temperature shift reaction zone is cooled to remove the heat of reaction and to remove sensible heat from the high temperature shift effluent so that the high temperature shift effluent is reduced to a high temperature shift temperature of between about 250° C. and about 350° C. The cooling is accomplished by indirect heat transfer with a water/steam stream. The high temperature shift catalyst is selected from the group consisting of iron oxide, chromic oxide, and mixtures thereof. The high temperature shift effluent is passed to a low temperature shift zone and contacted with a low temperature shift catalyst to further reduce the carbon monoxide and produce a low temperature shift effluent. The low temperature shift catalyst comprises cupric oxide (CuO) and zinc oxide (ZnO). Other types of low temperature shift catalysts include copper supported on other transition metal oxides such as zirconia, zinc supported on transition metal oxides, or refractory supports such as silica or alumina, supported platinum, supported rhenium, supported palladium, supported rhodium, and supported gold. It is more preferred that the low temperature shift catalyst comprise copper promoted zinc oxide and/or gold promoted titanium dioxide. The low temperature shift reaction is a highly exothermic reaction and essentially all of the heat of the low temperature shift reaction and some sensible heat is removed by indirect heat exchange in a second heat exchange zone with a water stream to produce a steam stream. In the present invention, heat removal from the high temperature shift reaction zone and the low temperature shift reaction zone occurs throughout the water gas shift reaction vessel. The steam stream is admixed with a hydrocarbon feedstock for a reforming zone to further conserve thermal energy and provide steam to the reforming zone. The water gas shift effluent stream or hydrogen product comprises less than about 0.5 mol-% carbon monoxide.

For fuel cells such as PEM fuel cells which are sensitive to carbon monoxide, the hydrogen product is passed to a carbon oxide oxidation zone at effective oxidation conditions and contacted with a selective oxidation catalyst to produce a carbon oxide-reduced hydrogen product gas stream comprising less than about 40 ppm-mole carbon monoxide. Preferably, the carbon oxide-reduced hydrogen product gas stream comprises less than about 10 ppm-mole carbon monoxide, and more preferably, the carbon oxide-reduced hydrogen product gas stream comprises less than about 1 ppm-mole carbon monoxide. The heat of oxidation produced in the carbon monoxide oxidation zone is removed in a conventional manner by cooling the carbon monoxide oxidation zone in a conventional means such as with a water jacket and a cooling water stream.

One of the problems in developing hydrogen generation in small-scale reforming systems is the elimination of thermal cycling of the vessels. Such cycling can result in thermal stresses which lead to fatigue fractures at the welds. Variations in turndown rate, fuel rate, and fuel quality in prior art systems often resulted in a thermal cycling throughout the system.

The present invention solves a number of problems presented by the need to convert a hydrocarbon stream into a hydrogen stream with a relatively low concentration of carbon monoxide. The problems solved by the present invention include providing a compact water gas shift reaction vessel, providing a water gas shift reaction vessel which minimizes thermal cycling, providing a water gas shift reaction vessel which provides a rapid steam generation response to variations in water gas shift reactor throughput, and providing a water gas shift reactor which provides improved operating reactor safety. As described hereinabove, the present invention achieves an essentially constant wall temperature which essentially eliminates thermal cycling in the water gas shift reaction vessel. Furthermore, steam generation can be controlled to compensate for rapid swings in the operation of the water gas shift reactor in response to demands for electric power without impacting the reaction side of the water gas reaction vessel. In the present invention, the amount of cooling in the reactor vessel is controlled by adjusting the water level in the reservoir. During the operation of the water gas shift reactor, the steam jacket location provides an extra margin of safety. By completely surrounding the reaction zone, the critical area where heat is generated can be effectively cooled to provide a consistently controlled reaction by the effective removal of heat from the water gas shift reaction zone. One unexpected benefit was the discovery that the cooling of the water gas shift reaction zone from about 650° C. to about 160° C. provided essentially the right amount of heat to vaporize approximately 2 moles of steam per mole of methane fed to the reforming zone preceding the water gas shift reactor. The 2 moles of steam per mole of methane ratio is essentially an optimal ratio for the operation of the reforming zone for the conversion a hydrocarbon feed into a mixture of hydrogen, water, and carbon oxides.

The intimate arrangement or loading of the high temperature water gas shift catalyst with catalyst for carrying out the water gas shift reaction at lower temperatures provides a minimum overall catalyst volume which can be placed in intimate contact with a heat transfer surface for removing heat from the water gas shift reaction zone. In the present invention, the high temperature shift catalyst is disposed in an upper portion of the water gas shift reaction vessel and the amount of high temperature water gas shift catalyst disposed in the reaction vessel is decreased from the top of the reaction vessel toward a point about less than about 40 percent of the length of the catalyst bed from the top of the catalyst bed. As the amount of high temperature shift catalyst is reduced, it is replaced by an equivalent amount of low temperature shift catalyst. In one variation, medium temperature water gas shift catalyst selected from the group consisting of copper promoted iron oxide, copper promoted chromia, and mixtures thereof is disposed between the high temperature shift catalyst and the low temperature shift catalyst. The catalyst may be disposed on the inside wall of the reactor as a coating, or the catalyst may be disposed in a fixed bed. In an alternative catalyst arrangement, a layer of methanation catalyst is disposed at the bottom of the catalyst zone. The methanation reaction is exothermic and can provide for reheating the bottom of the water gas shift reactor to maintain an effective low temperature shift reaction temperature and to extend the effective low temperature reaction region in the low temperature shift reaction zone. The methanation catalyst comprises nickel on silica or nickel on alumina.

DETAILED DESCRIPTION OF THE DRAWINGS

Figure 2:
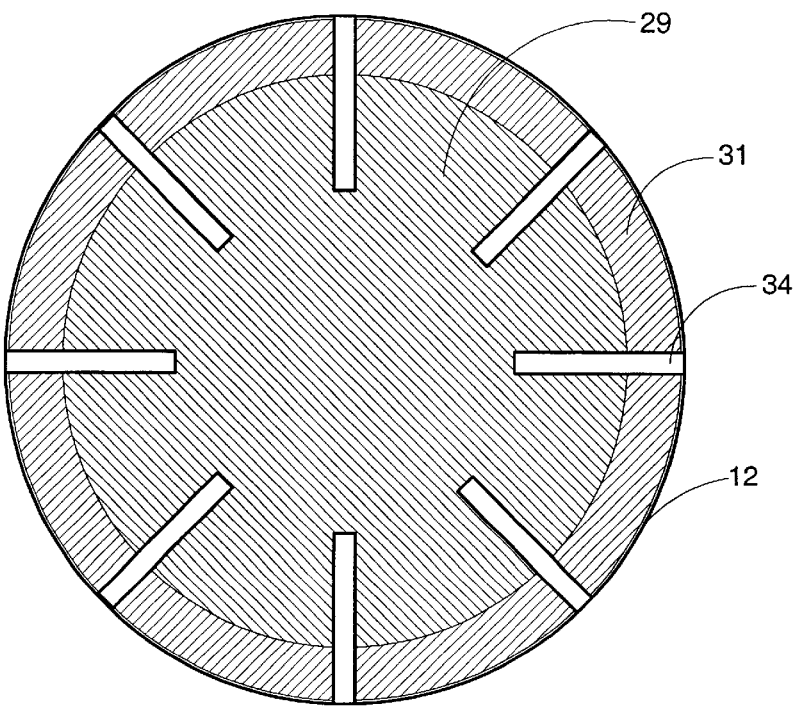
FIG. 2 is a top cross sectional view of the catalyst loading in the reactor shell at the top of the catalyst transition zone.
Figure 3:
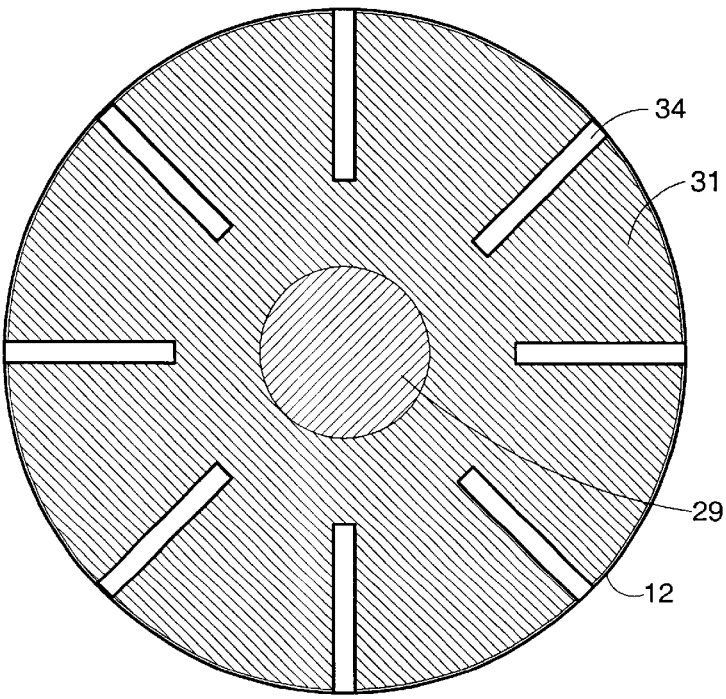
FIG. 3 is a top cross sectional view of the catalyst loading in the reactor shell at the bottom of the catalyst transition zone.

The present invention comprises a thermosiphon shift reactor 10 for the conversion of carbon monoxide and the generation of steam for use in a fuel processor to generate hydrogen for a fuel cell. Although the thermosiphon shift reactor 10 can be based on any physical configuration such as a cylinder, a sphere, or a vertically arranged plurality of coated plates, it is most easily understood as a hollow cylinder. Referring to FIG. 1, a vertically extended shell 12 defines an interior volume containing a vertical axis 35 which defines a length of the catalyst zone 15. The vertically extended shell has a gas inlet 14 at the top end 16 and a gas outlet 32 at a bottom end 30. The catalyst zone 15 is shown as a fixed bed divided into at least three sections: a, b, and c, and contains water gas shift catalyst. The catalyst in the catalyst zone 15 is arranged to provide a descending temperature profile to correspond to the rate of reactions taking place in the catalyst zone 15. Section a largely contains high temperature shift catalyst 29, section c largely contains a low temperature shift catalyst 31, and section b contains a transition mixture of high temperature shift catalyst 29 and low temperature shift catalyst 31 arranged in a stepped or conically tapered fashion such that in the transition from section a to section c, the amount of high temperature shift catalyst 29 is reduced relative to the amount of low temperature shift catalyst 31. According to the present invention, the high temperature shift catalyst is disposed in successively tapering, or stepped layers along the vertical axis 35 from the top of the catalyst zone (section a) to a point less than about 40 percent of the length of the catalyst zone 15 from the top of the catalyst zone 15 (shown as the boundary between section b and section c) whereinafter the catalyst zone 15 comprises essentially all low temperature shift catalyst 31. Section b may comprise a medium temperature shift catalyst. The high temperature shift reaction proceeds at a relatively rapid rate while the low temperature shift reaction takes place at a slower rate. By combining the high and low temperature shift reactions in this manner, the overall reactor volume and the corresponding cost of the shift reactor is reduced. In addition, the copper-based low temperature shift catalyst is temperature-sensitive and its catalyst life is reduced by exposure to temperature excursions and exposure to the high temperatures of the high temperature shift reaction. By the step-wise tapering, the high temperature shift catalyst zone and surrounding the successively smaller high temperature catalyst layers with an outer ring of low temperature shift catalyst, a descending temperature profile through the thermosiphon shift reactor is maintained while protecting the low temperature shift catalyst. At the bottom of section c, the catalyst zone 15 optionally comprises a methanation catalyst in a lower layer (not shown) at the bottom of the catalyst zone 15. As shown in FIG. 2, a cross section at 2—2, and FIG. 3, a cross section at 3—3, the layers comprise an inner core containing high temperature shift catalyst 29 and an outer ring comprising low temperature shift catalyst 31. The vertically extended shell 12 is surrounded by an external jacket 28 which sealingly surrounds the outside of the vertically extended shell 12. The external jacket 28 is disposed parallel to the catalyst zone and defines a flow passage 24 between the vertically extended shell 12 and the external jacket 28. The external jacket 28 has a fluid inlet 27 and a fluid outlet 25, and both the fluid inlet 27 and the fluid outlet 25 are in fluid communication with the flow passage 24. A fluid reservoir 11 is disposed in a position above the top end 16 at a height which is effective to provide a return of fluid from the fluid reservoir 11 and in a proximity to the fluid outlet 25 that permits the external jacket 28 to act as a thermosiphon. The fluid reservoir 11 has a water supply inlet 22, a steam outlet 20, an inlet conduit 18 in fluid communication with the fluid outlet 25, and an outlet conduit 23 in fluid communication with the fluid inlet 27 of the external jacket 28. A liquid level measuring device (not shown) is used to measure the liquid level in the fluid reservoir 11 and a water supply valve (not shown) disposed on the water supply inlet 22 is opened to maintain the liquid level in the fluid reservoir 11 in response to the demand for steam. In one embodiment, an insulating layer 26 is disposed on the vertically extended shell 12 within the flow passage 24 defined by the external jacket 28 and the vertically extended shell 12. The insulating layer 26 serves to moderate the temperature fluctuations between the catalyst zone (a, b, and c) and the flow passage 24 wherein the steam is generated. In a preferred arrangement, the thickness of the insulation layer 26 is varied such that the insulation layer 26 is thin at the top of the vertically extended shell 12 and is gradually increased toward the bottom of the catalyst zone to transfer the maximum amount of heat at the highest temperature of the high temperature shift reaction at the top of the catalyst zone and to provide greater moderation of the temperature of the shift reactor product gases leaving the thermosiphon shift reactor 10. The insulation layer 26 comprises an insulation selected from the group consisting of zirconium oxide ($ZrO_2$), alumina ($Al_2O_3$), silica ($SiO_2$), and mixtures thereof. In an alternate embodiment, a plurality of fin plates 34 (shown in FIG. 2 at cross section 2—2 and in FIG. 3 at cross section 3—3) is disposed rigidly within the catalyst zone extending vertically along, and aligned radially about the vertical axis. The fin plates 34 act as a heat sink to improve the transfer of heat from the catalyst zone 15 to the reactor wall 12 or vertically extended shell. The shape of the heat sink is not critical and may take the form of rods or fin plates. The fin plates 34 are disposed in intimate thermal contact with the vertically extended shell 12. The fin plates 34 extend radially between about 10 percent to about 70 percent of the radius of the shell 12 into the catalyst zone. FIG. 2 and FIG. 3 illustrate the arrangement of the water gas shift catalyst in section b. FIG. 2 represents a cross-section of the catalyst zone 15 at a point between section a and section b (shown as cross section 2—2 in FIG. 1) wherein the high temperature shift catalyst 29 is disposed in the core of the cross-section and the low temperature shift catalyst is disposed surrounding the core and the core area of high temperature is greater than the surrounding area of low temperature shift catalyst 31. The fin plates 34 are radially distributed about the center of the catalyst zone and extend from the shell 12 toward the center. The fin plates 34 disposed in the catalyst zone 15 conduct heat from the catalyst zone to the shell 12 where heat is removed by the generation of steam in the flow passage 24 between the external jacket 28 and the vertically extended shell 12. FIG. 3 represents a cross-section of the catalyst zone 15 at a point between section b and section c(shown as cross section 3—3 in FIG. 1), wherein the core area of high temperature shift catalyst 29 is reduced relative to the ring area of low temperature shift catalyst 31 that surrounds the core of high temperature shift catalyst 29 within the vertically extended shell 12. The thermosiphon shift reactor comprising the vertically extended shell, jacket, and reservoir may be constructed of a steel material selected from the group consisting of 304, 316, $2_{1/4}$ $Cr_{-1/2}Mo$, and KCS steel.

The operation of a thermosiphon shift boiler of the present invention was simulated with an engineering design and simulation system the results of which are presented in the following examples.

EXAMPLES

Example I

A cylindrical thermosiphon shift reactor of the present invention is loaded with conventional high temperature shift catalyst comprising iron oxide ($Fe_2O_3$) and conventional low temperature shift catalyst comprising copper (Cu/ZnO) according to the catalyst distribution shown in FIG. 1. Section a of the catalyst zone 15 contains about 24.5 percent of the total catalyst volume and consists of the high temperature shift catalyst. Section c of the catalyst zone 15 contains about 53.9 percent of the total catalyst volume and consists of the low temperature shift catalyst. Section b contains about 21.6 percent of the total catalyst volume which consists of about 38 percent high temperature shift catalyst and about 63 percent low temperature shift catalyst. The high temperature shift catalyst is disposed in a core portion of section b and the low temperature shift catalyst is disposed in an annular ring surrounding the core portion. The volume of high temperature shift catalyst is tapered in layers through section b according to a ratio of about 4:1 high temperature shift catalyst to low temperature shift catalyst. The total length of the catalyst zone is about 0.6 meters. Fin plates disposed on the inside of the reactor shell and extending about 70 percent of the radial dimension of the cylindrical thermosiphon shift reactor shell provide additional heat transfer surface between the catalyst bed and the thermosiphon shift reactor shell. A feed gas comprising about 7.5 mol-% carbon monoxide, 7.7 mol-% carbon dioxide, 42 mol-% hydrogen, 1 mol-% methane, 22 mol-% water, and the balance nitrogen is introduced at the top of the thermosiphon shift reactor at a temperature of about 650° C. The radial average temperature and the carbon monoxide conversion along the length of the catalyst bed are shown in Table 1.

TABLE 1

CO Conversion and Average Catalyst Bed Temperature

| Distance Along Catalyst Bed, % | Radial Average Temperature, ° C. | Carbon Dioxide Conversion, % |
| --- | --- | --- |
| 0.0 | 650 | 0 |
| 17 | 330 | 50 |
| 33 | 240 | 67 |
| 50 | 180 | 71 |
| 66 | 150 | 72 |
| 83 | 125 | 72 |

Example II

The cylindrical thermosiphon shift reactor of Example I has a shell surrounding the catalyst zone containing high and low temperature shift catalyst. Water is introduced at the bottom of the external jacket and a steam/water mixture is withdrawn from the top of the jacket and passed to a reservoir. Steam is withdrawn from the reservoir as required for reforming a hydrocarbon fuel and make-up water is passed to the reservoir to maintain an effective level in the reservoir, while a portion of the fluid in the reservoir is returned to the bottom of the external jacket. The circulation of the water to the external jacket, upward through the external jacket, and returning from the external jacket are facilitated by a thermosiphon effect from the removal of heat from the exothermic catalyst zone. Surprisingly, as shown in Table 2, by the step-wise tapering the high temperature shift catalyst distribution according to the present invention and establishing a thermosiphon circulation on the wall of the catalyst zone, an average descending temperature profile through the catalyst bed is obtained which provides an essentially uniform temperature at the wall of the reactor shell. The uniform temperature of the shell wall eliminates the problem of thermal cycling with minor changes in demand for electric power or minor process upsets.

TABLE 2

Reactor Wall Temperature

| Distance Along Catalyst Bed, % | Shell-Wall Temperature, ° C. |
|---|---|
| 0.0 | 650 |
| 5 | 140 |
| 17 | 125 |
| 33 | 120 |
| 67 | 116 |

What is claimed is:

1. A thermosiphon shift reactor for conversion of carbon monoxide and generation of steam for use in a fuel processor comprising:
    a vertically extended shell defining an interior volume containing a vertical axis defining a catalyst zone, said catalyst zone comprising a shift catalyst that extends along a vertical length, said vertically extended shell having a gas inlet at a top end and a gas outlet at a bottom end opposite;
    an external jacket sealingly surrounding the vertically extended shell parallel to the catalyst zone and defining a flow passage between the vertically extended shell and the external jacket, said external jacket having a fluid inlet in proximity of the bottom end and a fluid outlet opposite;
    a fluid reservoir disposed above the top end at a height effective to provide thermosiphon circulation through said flow passage, said fluid reservoir having an inlet conduit in fluid communication with the fluid outlet, a water supply inlet, and an outlet conduit in fluid communication with the fluid inlet of the external jacket; and
    an insulating layer disposed on the vertically extended shell within the flow passage.

2. A thermosiphon shift reactor for conversion of carbon monoxide and generation of steam for use in a fuel processor comprising:
    a vertically extended shell defining an interior volume containing a vertical axis defining a catalyst zone, said catalyst zone comprising a high temperature shift catalyst disposed in a fixed bed having layers along the vertical axis from the top end to a point less than about 40% of the vertical length from the top end, wherein said layers comprise an inner core containing the high temperature shift catalyst and an outer ring comprising low temperature shift catalyst and the inner core is reduced from the top end to said point, said vertically extended shell having a gas inlet at a top end and a gas outlet at a bottom end opposite;
    a jacket sealingly surrounding the vertically extended shell along at least a portion of the vertical length of the catalyst zone and defining a flow passage between the vertically extended shell and the jacket, said jacket having an upper portion with a fluid outlet and a lower portion with a fluid inlet;
    an insulating layer disposed on the vertically extended shell within the flow passage; and
    a fluid reservoir located at a height effective to provide thermosiphon circulation through said flow passage, said fluid reservoir having an inlet conduit in fluid communication with the fluid outlet, a water supply inlet, and an outlet conduit in fluid communication with the fluid inlet of the jacket.

3. The thermosiphon shift reactor of claim 2 wherein the vertically extended shell, jacket, and reservoir are constructed of a steel selected from the group consisting of 304, 316, $2_{1/4}$ Cr-$_{1/2}$Mo, and KCS steel.

4. The thermosiphon shift reactor of claim 2 wherein the high temperature shift catalyst is selected from the group consisting of iron oxide, chromium oxide, and mixtures thereof.

5. The thermosiphon shift reactor of claim 2 wherein the low temperature shift catalyst comprises copper-promoted zinc oxide and gold-promoted titanium dioxide.

6. The thermosiphon shift reactor of claim 2 wherein the catalyst zone further comprises a layer of methanation catalyst disposed at a bottom end of the catalyst zone.

7. The thermosiphon shift reactor of claim 6 wherein the methanation catalyst comprises nickel on silica or nickel on alumina.

8. The thermosiphon shift reactor of claim 2 wherein the insulating layer comprises a thickness that increases from a top end to a bottom end of the catalyst zone.

9. The thermosiphon shift reactor of claim 2 wherein the insulating layer comprises an insulation selected from the group consisting of zirconium oxide, silica, alumina, and mixtures thereof.

10. The thermosiphon shift reactor of claim 2 further comprising a bonding layer between the insulating layer and the vertically extended shell.

* * * * *